May 20, 1958 J. G. KAVANAUGH 2,835,209
RAILWAY CAR WITH TILTING TURNTABLE
Filed Oct. 12, 1954 2 Sheets-Sheet 1

INVENTOR.
JOSEPH G. KAVANAUGH
BY Ray S Pyle
ATTORNEY

May 20, 1958 J. G. KAVANAUGH 2,835,209
RAILWAY CAR WITH TILTING TURNTABLE
Filed Oct. 12, 1954 2 Sheets-Sheet 2

INVENTOR.
JOSEPH G. KAVANAUGH
BY Ray S Pyle
ATTORNEY

United States Patent Office 2,835,209
Patented May 20, 1958

2,835,209

RAILWAY CAR WITH TILTING TURNTABLE

Joseph G. Kavanaugh, Lakewood, Ohio

Application October 12, 1954, Serial No. 461,755

3 Claims. (Cl. 105—368)

This invention relates to the transportation of automotive-type trailers by railway cars, and relates specifically to a means for loading and unloading the trailers individually from the railway cars.

An object of this invention is to provide a tiltable ramp for elevating a wheeled vehicle from one level to another without a hoist mechanism.

Another object of this invention is to provide a self-contained loading and unloading mechanism for a railway car to permit the loading or unloading of trailers directly from a railway car without auxiliary terminal equipment or requirement to pass over other cars.

A still further object of this invention is to provide a tilting superstructure mountable between the ends thereof on a tilting device in order that the trailer may be positioned on the tilted superstructure in a near-balanced position and will require little power to level or tilt the superstructure and trailer.

Other objects and a fuller understanding of the invention may be had by referring to the following description and claims, taken in conjunction with the accompanying drawing, in which:

Figure 1:
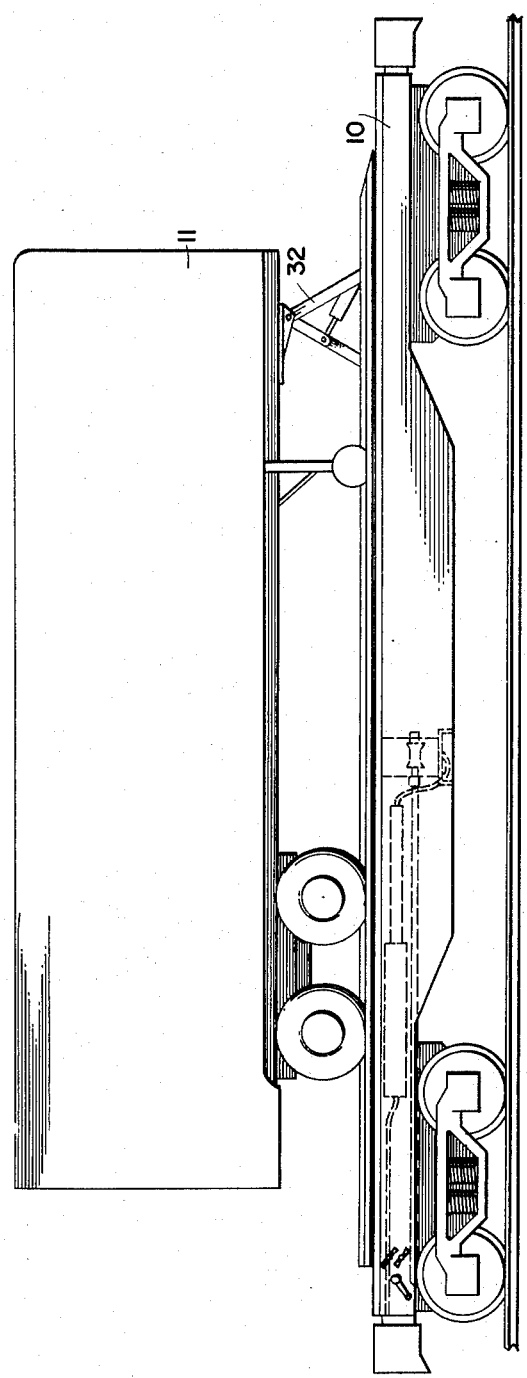
Figure 1 is a side view of a trailer loaded on a railway car equipped with the loading equipment of this invention.

The drawing illustrates a specific proposed preferred embodiment of the invention. A standard type railway car 10 is illustrated for the purpose of setting forth this invention although special built cars may be somewhat more suited for carrying out the invention. Nevertheless, with the abundance of surplus railway cars now available, there will undoubtedly be use made of these surplus cars before special cars are built and, accordingly, an adaptation of a standard car 10 is illustrated in the drawings. A standard type trailer 11 is illustrated on the car 10 as mounted and carried thereon by the apparatus of the present invention.

Figure 2:
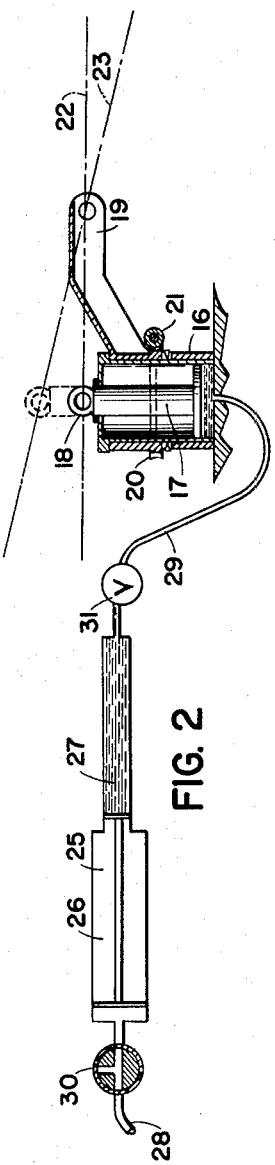
Figure 2 is a schematic illustration of the tilting and pivoting mechanism for the superstructure, and the adaptation of the normal air pressure available on railway cars to operate the mechanism.
Figures 3, 4:
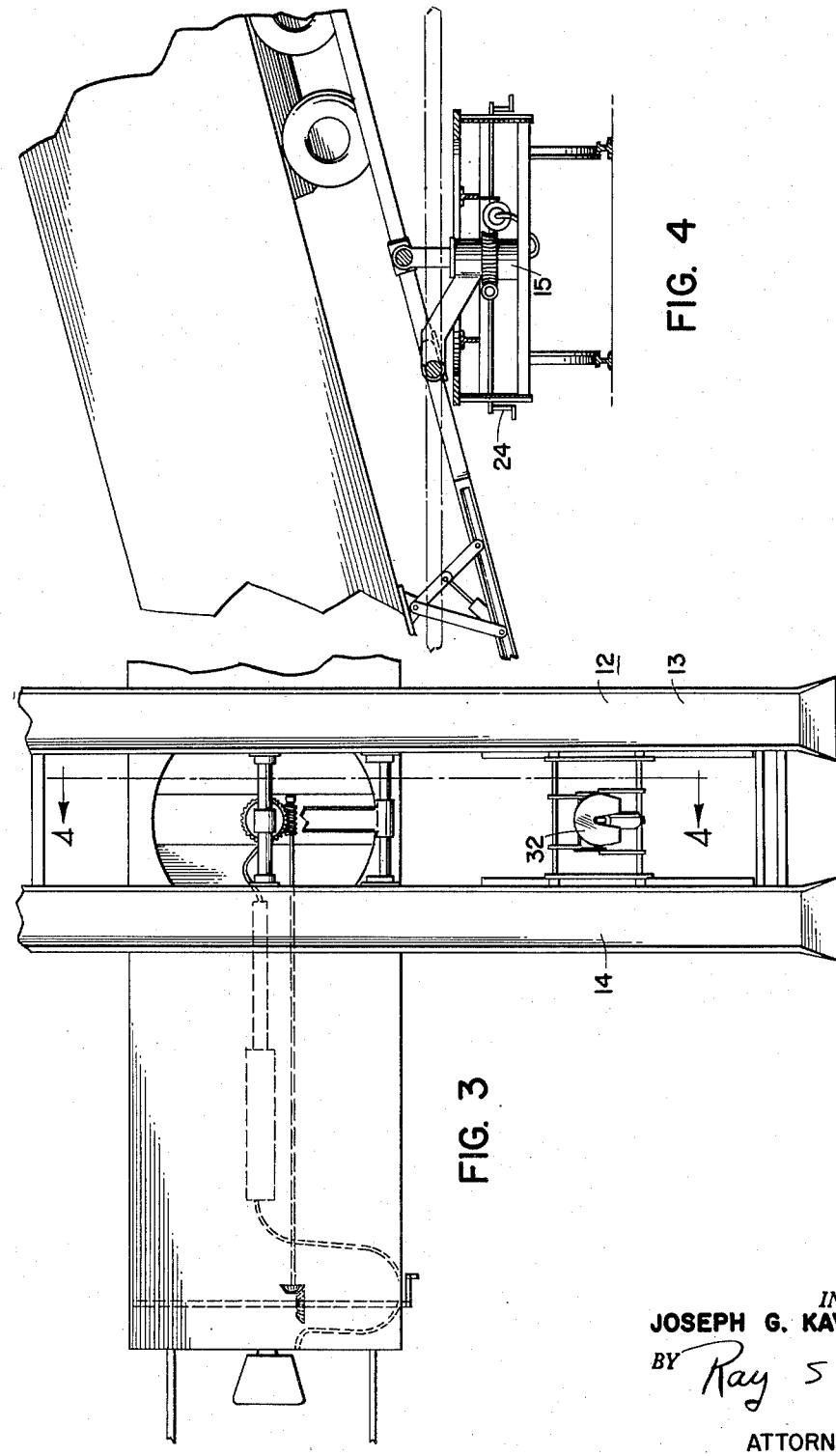
Figure 3 is a top view of the railway car with the loading mechanism of this invention pivoted to a lateral position and tilted to receive a trailer.
Figure 4 is a view taken along line 4—4 of Figure 3 but with the addition of a trailer illustrated on the superstructure ramp not illustrated in Figure 3.

The invention is best illustrated in the Figures 2 through 4. In this embodiment the invention comprises a superstructure 12 which is tiltable to serve as a loading ramp, and pivotable to a longitudinal position on the car 10 to carry the trailer 11 between loading points. Superstructure 12 is composed of two treads 13 and 14 joined rigidly together by suitable bracing and reinforcing structure.

The superstructure 12 is tilted and pivoted by the pivoted tilter 15 which is illustrated schematically in Figure 2 of the drawings. In this embodiment of the invention, the pivoted tilter 15 comprises a cylinder 16 pivotally mounted on the car 10 substantially in the position illustrated in the Figure 1 of the drawings. A ram piston 17 is mounted in the cylinder 16 and has a pivot connection 18 with the superstructure 12. In the Figure 2, the superstructure 12 is eliminated for simplicity of illustration and is represented by the horizontal line 22 and the angular tilt position line 23. A fulcrum arm 19 extends from the cylinder 16 to a lateral position and carries the superstructure 12 in a pivotal connection. Thus, fluid pressure entering the chamber defined by the cylinder 16 and the piston 17 will tilt the superstructure 12 about the fulcrum arm 19. Such a tilted position wherein the ram piston 17 is raised, is illustrated in the Figure 4 of the drawing.

As stated before, the pivoted tilter 15 is pivotally mounted on the car 10 in order to swing the superstructure 12 between a horizontally aligned position with respect to the car 10, and a lateral position suitable for tilting into the position illustrated in Figure 4. A gear collar 20 on the cylinder 16 and a worm 21 are mechanically driven by means of a crank drive 24 as indicated in Figure 4 of the drawing. Also, power pivoting of the device 15 is entirely possible. It has been found that the proper location of the trailer 11 upon the loading device of this invention will permit manual operation of the pivoting mechanism. An attendant is required to supervise the loading and unloading of the trailer 11 and, accordingly, that attendant can readily pivot the superstructure without employing expensive drive equipment.

However, the tilting of the superstructure 12 between a loading and a level position requires more power than is readily available from manual sources, particularly if the cargo in the trailer is not distributed properly. Railway cars are normally provided with air pressure for operation of brakes. This pressure is not sufficient for operating the pivoted tilter 15 with a loaded trailer thereon if the trailer is not pivotally balanced. According, an intensifier 25 of well-known construction may be employed to make such air pressure available for operating the pivoted tilter 15. The intensifier 25 has an air chamber 26 and a hydraulic chamber 27 with an air line 28 leading to the chamber 26 through a control valve 30. A hydraulic line 29 leads from the hydraulic chamber 27 to the pivoted tilter 15 through a safety valve 31. The valve 31 may be controlled by a cam carried by the superstructure 12 to prevent operation of the ram piston 17 while in the longitudinal position or before fully pivoted to the tilt position.

The superstructure 12 is also provided with a folding hitch 32 which may be dropped down between the threads 13 and 14 during loading, and raised by suitable means such as a hydraulic or mechanical jacking mechanism as the trailer is brought into proper relative position upon the superstructure 12. Auxiliary blocking and holding mechanism may be employed as now done with conventional type of trailer carrying. The use of such blocking, plus the fact that the hitch 32 is preferably permanently located, will dictate the position of the trailer 11 upon the superstructure 12. This position is calculated to provide a substantially balanced position of the trailer 11 with respect to the pivoted tilter 15. Thus, a minimum amount of tilting power is required. However, as previously indicated, the location of the cargo within the trailer 11 will materially affect the amount of power which may be necessary to tilt the loaded superstructure 12 or to settle the loaded superstructure into a leveled position.

The advantages of the present invention should now be readily apparent. Trailers may be located upon the superstructure 12 at any place where there is a level surface next to the tracks where a truck may back up to the side of the car 10. For example, in very remote towns without docking facilities, loading can actually be carried out at railway crossings. Loading and unloading can be accomplished in such a short period of time that the legal limit for blocking grade crossings will not be exceeded. Furthermore, each individual car can be loaded or unloaded without regard to other cars in the train and, consequently, no particular arrangement of cars is required and there is no necessity for delay in unloading one particular trailer 11 because of the necessity of first removing another trailer from other cars as now required with some conventional systems. Furthermore, an entire train of cars can be unloaded or loaded simultaneously.

Attention is called to the fact that a railway car is essentially a platform. Accordingly, the method of loading a vehicle into a railway car with or without the pivoting feature, is adaptable to raising a vehicle onto a platform for servicing. Thus, an inexpensive, safe, and convenient lift device for service stations and garages can be constructed employing the basic feature of this invention.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for loading, unloading, and carrying a wheeled vehicle on an elevated structure, comprising, a longitudinal superstructure forming a ramp and platform, a carriage adapted to be mounted upon an elevated structure and rotatable about a substantially vertical axis, said carriage comprising a pivot and a vertically acting lift device with said pivot and lift device disposed in spaced relation to one another in a common vertical plane along the longitudinal axis of said superstructure, said superstructure being pivotally mounted on said pivot for tiltable pivoting about the pivot as a fulcrum, said lift device being interconnected to said superstructure at a distance from said pivot fulcrum, said superstructure being supported by said pivot and lift device free of any other support whereby said superstructure may be rotated in level position and tilted under fully controlled conditions at all times.

2. Apparatus for loading, unloading, and carrying a wheeled vehicle on an elevated structure, comprising, a longitudinal superstructure forming a ramp and platform, a vertically extending cylinder having a piston and piston rod therein adapted to be mounted upon an elevated structure, said cylinder serving as a carriage rotatable about the longitudinal axis of said piston rod, a pivot mounted upon said carriage, said pivot and piston rod being disposed in spaced relation to one another in a common vertical plane along the longitudinal axis of said superstructure, said superstructure being pivotally mounted on said pivot for tiltable pivoting about the pivot as a fulcrum, said piston rod being interconnected to said superstructure at a distance from said pivot whereby said superstructure is supported by said pivot and piston rod and may be rotated in level position and tilted at will under fully controlled conditions.

3. In combination, a railroad car and an apparatus for loading and unloading a wheeled vehicle on and from the car at any location where the ground level is about level with the rail ties of a roadbed carrying the car, said car having a longitudinal and a width dimension, a fulcrum base supported on said car to swivel about a vertical axis, an elongated table superstructure, a fulcrum joint connecting said turnable fulcrum base and table superstructure so that said table superstructure swings with the turning of said fulcrum base between a position in which the load delivering end portion of the table superstructure overlies said car to a pretilting lateral position where said table superstructure is free to tilt without interference from said car, a power operated lift device carried by said turnable fulcrum base, said lift device and fulcrum joint being disposed in spaced relation to one another in a common vertical plane along the longitudinal axis of said table superstructure, said lift device being interconnected to said superstructure for raising and lowering the superstructure in a tilting movement about said fulcrum joint under full power control.

References Cited in the file of this patent

UNITED STATES PATENTS

| 1,271,812 | Wagner | July 9, 1918 |
| 1,449,767 | MacLean | Mar. 27, 1923 |
| 2,246,543 | Smith | June 24, 1941 |
| 2,313,335 | Godfrey | Mar. 9, 1943 |
| 2,373,148 | Smith | Apr. 10, 1945 |
| 2,572,776 | Smith | Oct. 23, 1951 |

FOREIGN PATENTS

| 644,715 | Germany | May 12, 1937 |